United States Patent
Chiarabini et al.

[19]

[11] Patent Number: 5,930,469

[45] Date of Patent: Jul. 27, 1999

[54] PRINTING DRIVER AND PRINTER WHICH UTILIZE ADAPTIVE OBJECT BANDING

[75] Inventors: Luca Chiarabini; Xavier Rigau Rigau; Sergi Jarne; Jordi Montserrat, all of Sant Cugat, Spain

[73] Assignee: Hewlett-Packard Company, Palo Alto, Calif.

[21] Appl. No.: 08/857,225

[22] Filed: May 15, 1997

[51] Int. Cl.⁶ .................................................. G06K 15/00
[52] U.S. Cl. .......................................... 395/116; 395/117
[58] Field of Search ...................................... 395/101, 102, 395/112, 113, 114, 115, 116, 117, 876, 894; 358/404, 444; 345/433, 434, 196, 516, 517, 525

[56] References Cited

U.S. PATENT DOCUMENTS 5,216,754  6/1993  Sathi et al. .............................. 395/113
5,500,928  3/1996  Cook et al. ............................. 395/133

OTHER PUBLICATIONS

*HP–GL/2 and HP RTL Reference Guide*, Part no. 5959–9733, 1996, available from Hewlett Packard Co.,, pp. 373–375.

*Primary Examiner*—Arthur G. Evans

[57] ABSTRACT

A drawing is prepared for printing. An analysis of print complexity of the drawing is performed. The drawing is partitioned into print bands based on the analysis of print complexity of the drawing. The print bands are then forwarded in sequential order to a printing device.

20 Claims, 10 Drawing Sheets

PRINTING DRIVER AND PRINTER WHICH UTILIZE ADAPTIVE OBJECT BANDING

BACKGROUND

The present invention concerns printing information within a computing system and pertains particularly to a printer and printing driver which utilize adaptive object banding.

While of general use in the printing and display field, the present invention is especially useful in the field of computer driven printers particularly designed for producing engineering or other large drawings on paper, vellum, film or other print media which is drawn through the mechanism from a roll or from a manual or automatic sheet feed media path. Typically, the media may have a width from 8½ inches to as much as 3 or 4 feet or more.

With reference to a rectangular coordinate system, the paper or other print media is drawn through the printer in the X direction and a thermal inkjet printer carriage is mounted for movement transversely of the paper in what shall be referred to as the Y direction. A sheet of paper or other print media is either manually fed or paper is drawn from a supply roll thereof around a platen roller which may or may not be power driven. When the printer apparatus employs a thermal inkjet printing head or heads, precise control of the spacing between the print heads and the surface of the print media on which printing is to take place is essential otherwise acceptable print resolution is lost.

Inkjet printers, such as those sold by Hewlett Packard Company which has a business address of 3000 Hanover Street, Palo Alto, Calif. 94304, offer substantial improvements in speed over the conventional X-Y plotter. Inkjet printers typically include a pen having an array of nozzles. The pens are mounted on a carriage which is moved across the page in successive swaths. Each inkjet pen has heater circuits which, when activated, cause ink to be ejected from associated nozzles. As the pen is positioned over a given location, a jet of ink is ejected from the nozzle to provide a pixel of ink at a desired location. The mosaic of pixels thus created provides a desired composite image.

Using printers for large print media introduces special problems. For example, when printing larger raster images a significant amount of printer memory may be required. If the printer does not have enough memory to print an image, some sort of error will occur.

More specifically, raster images are printed using rasterization. Rasterization is a process wherein graphics primitives (such as line drawing commands) are received by a printer and from these the printer generates a bitmap that corresponds to the graphical representation of the primitives.

High end printer devices use specialized software and hardware to perform rasterization. The specialized hardware typically includes a processor and an embedded real-time operating system. The rasterization of objects within the printer itself (referred to as "object mode" printing) generally provides excellent printing performance. However, complex drawings often involve large raster images. For large raster images, rasterization can require a significant amount of memory which may result in overrunning printer memory.

In order to avoid an "out-of-memory" error, some printer drivers use a "sleek" mode. For example, see the DesignJet model printers available from Hewlett-Packard Company. In sleek mode, the output is drawn up into a series of bands by the computing system before being sent to the printer. Thus the rasterization is not performed by the printer, but by a computing system connected to the printer. This computing system performs all graphic processing, usually breaking the original drawing into bands. Each band is rasterized and the resulting bit-mapped graphic for each band is sent to the printer for printing. While this is an effective work-around for printers with insufficient memory, the hardware processing power of the printer is wasted. Additionally, the performance of the printing when in sleek mode is closely related to the processing power and other resources of the computing system. The end result is generally a significant loss in overall performance, including an increase in total print time and longer delay in returning the user to the application calling the print driver.

BRIEF SUMMARY OF THE INVENTION

In accordance with the preferred embodiment of the present invention, a drawing is prepared for printing. An analysis of print complexity of the drawing is performed. The drawing is partitioned into print bands based on the analysis of print complexity of the drawing. The print bands are then forwarded in sequential order to a printing device.

The analysis of print complexity of the drawing is performed, in the preferred embodiment for example, by estimating drawing complexity within each swath of the drawing. This includes, for example, generating a boundary box for each graphics primitive within the drawing. A swath intersection is then computed for each boundary box. The swath intersection for each boundary box is used in computing the print complexity for each swath. The swath intersection is used to indicate which graphics primitives fall within a swath. An estimate of an amount of printer memory required to process each graphics primitive that falls within a swath is then used to calculate complexity of the swath. In the preferred embodiment, a swath histogram for the drawing is generated.

In the preferred embodiment, extra memory needed for clipping is taken into account when partitioning the drawing into print bands.

The present invention provides an effective way to increase printer performance when printing complex drawings. This increase in performance is achieved while avoid errors caused by overrunning the memory of a printer. Since the actual graphics primitives for each band are sent to the printer, the present invention result in a significant improvement over the use of a "sleek mode", giving the same benefits but making full use of the printer hardware. The present invention is especially useful for large media printers used to print complex drawings.

DETAILED DESCRIPTION OF THE PREFERRED EMBODIMENT

Figure 1:
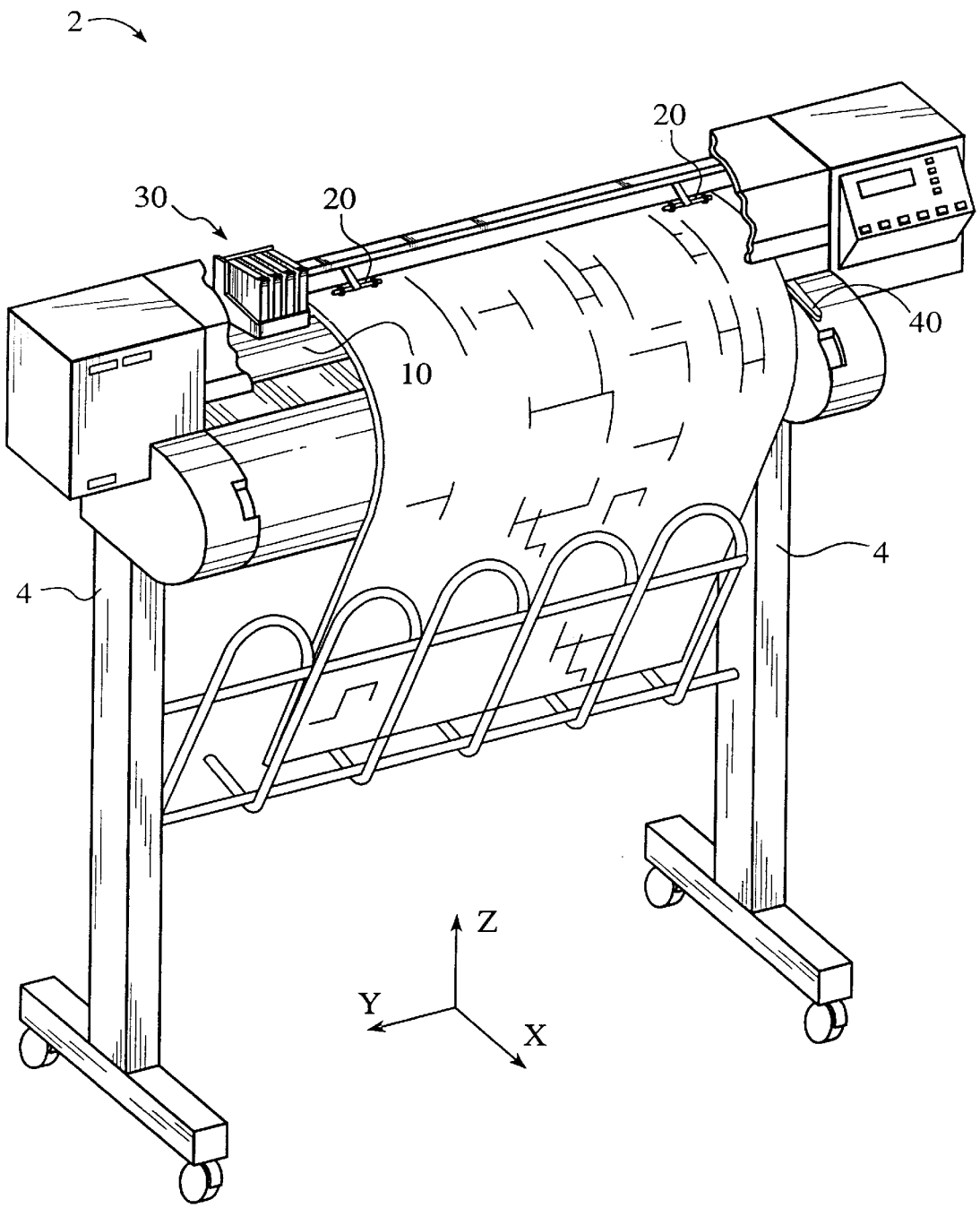
FIG. 1 is a perspective view of a printer/plotter mechanism showing the cover partly broken away to reveal a platen roller, pinch rollers and a print head carriage mounted on slider rods which extend parallel to the axis of the platen roller.

FIG. 1 is a perspective view of a printer/plotter mechanism having a chassis 2 supported by a pair of spaced legs 4 and a housing which includes a generally arcuate cover 6 for containing a roll 7 of print medium such as paper, vellum or film. As seen in the broken away section at the top of FIG. 1, a platen roller 10 extends transversely of the apparatus in the Y direction to provide a support and printing path at its upper surface for the medium upon which printing is to take place. A pair of slider rods support a transversely movable print head carriage 30, which scans in the y-axis direction, having a thermal inkjet print head or a plurality of thermal inkjet print heals mounted thereon which are positioned a precise distance above the platen roller 10. The top portions of four pinch rollers 2), two each being mounted on the tops of two different printer roller support members as is an actuating lever 40 for moving the print roller support members into and out of their operative position.

Figure 2:
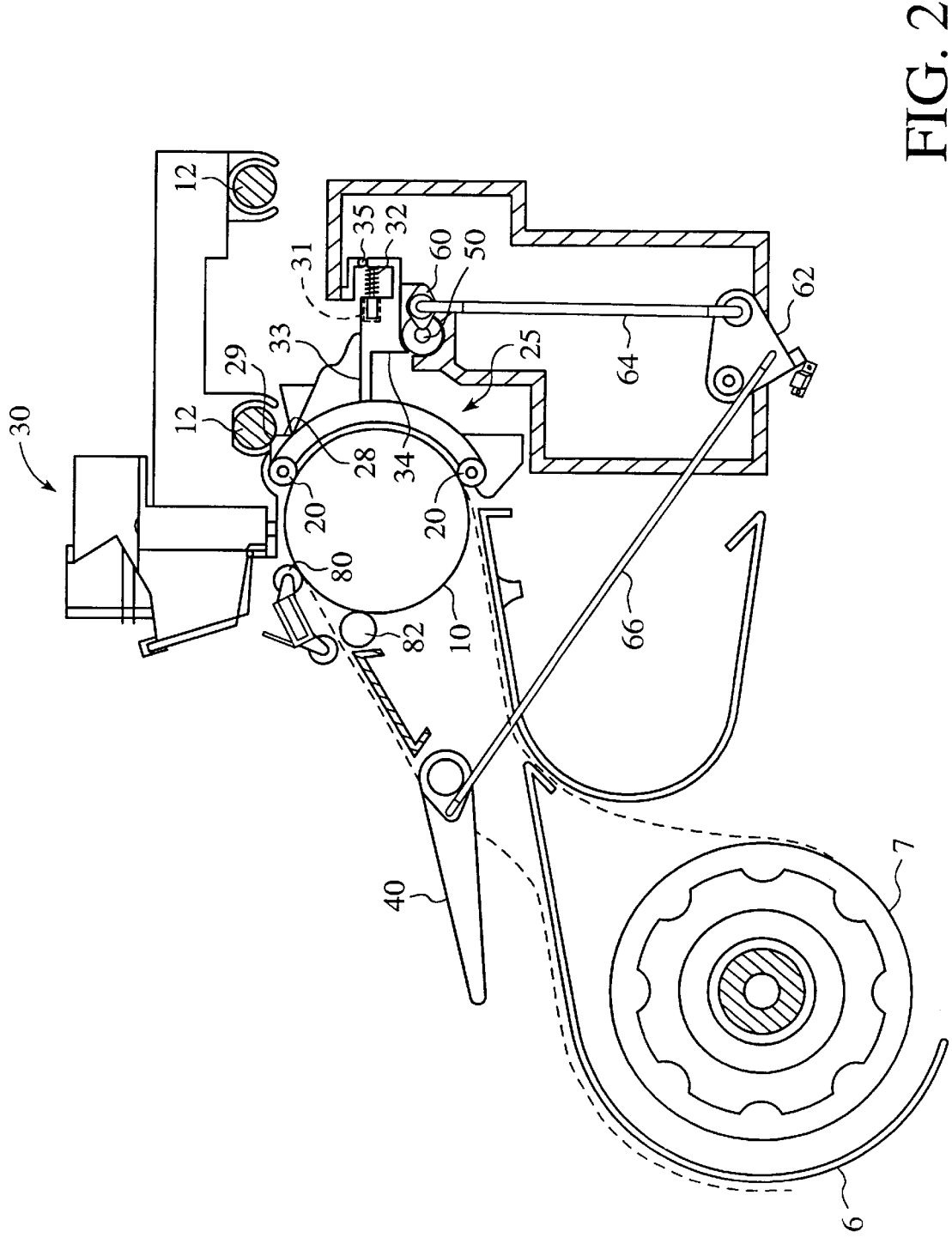
FIG. 2 is right hand cross sectional elevation showing the ends of the platen roller, pinch rollers and mechanism for moving the pinch roller support member into and out of an operative position for the printer/plotter shown in FIG. 1.

In FIG. 2, the paper or other print media path is shown by the dashed line. Also the pinch roller support member 25 has at least one rearwardly extending upper stabilizer shoulder 28 having in arcuate surface 29 thereon which limits upward motion of the pinch roller support member 25 when it is retracted away from the platen roller 10 by abutment of the surface 29 with one of two printer carriage slider rods 12 mounted on the chassis of the printer/plotter. A generally cylindrical support bearing is provided at the rearward end of the support arm 27 and is seen to have a bore 31 in the end thereof which receives one end of a compression spring 32.

A support bearing 35 is mounted on the printer/plotter chassis and has a circular/cylindrical interior surface which receives and supports the support arm 27. The inside diameter of the surface of bearing 35 is made slightly larger than the outside diameter of the bearing surface on the support arm 27 to permit vertical movement of the arm 27 in the bearing 35 within a selected angular tolerance. The distance from the captured end 28 of the support arm 27 to the centerline of the platen roller 10 is preferably about twice the distance from the centerline of the pinch rollers to the center of curvature of the arcuate media guide surface 21 which also generally coincides with the centerline of the platen roller 10. The compression spring 32 thus biases the pinch roller support member 25 and pinch rollers 20 toward the platen roller during printing. Thus, if the captured end 28 of the support arm is vertically displaceable in the bearing 35 within the selected angular tolerance, the pinchroller position will shift angularly around the platen roller 10 only about one half the selected angular bearing tolerance because the assembly is constrained to rotate about the center of the platen roller 10.

When it is desired to load a sheet of printing medium into the printer/plotter or printing medium either manually or from the roll 7 thereof, the paper is fed until movement of the lead end thereof is terminated by abutment in the nap between the lower pinch rollers 20 and the platen roller 10. The platen roller is then rotated in a counterclockwise direction to draw the paper between the platen roller 10 and the arcuate guide surface of the roller support member 25 and subsequently past the upper pinch rollers 20. Paper can be removed when desired by retracting the pinch roller support member 25 and pinch rollers 20 away from the platen roller 10. For this purpose, the support and actuation arm 27 has a substantially vertically extending shoulder 33 thereon which may be engaged by a retainer arm 34 which is fixedly attached to a transversely extending shaft 50 mounted in the printer/plotter chassis. Rotation of the shaft 50 to retract the pinch roller support member 25 to its open non-pinching position is accomplished by affixation of a bellcrank 60 to the shaft 50 so that the shaft may be rotated by movement of the bellcrank 60 which is in turn attached to a second bellcrank 62 by a connecting rod 64. The second bellcrank 62 is connected to the pinch arm release handle 40 by another connecting rod 66, the bellcranks and pinch arm release levers being pivotally affixed to the printer/plotter chassis or rotatable rod 50 in a manner which will be apparent to persons skilled in the art. It will be appreciated that a number of separate pinch roller support members 25 may be mounted along the length of the platen roller 10 and that all may be commonly moved to their operative position or retracted therefrom by providing a number of retainer arms 34 on the rotatable shaft 50 which is turned when desired by the pinch arm release lever linkage.

Figure 3:
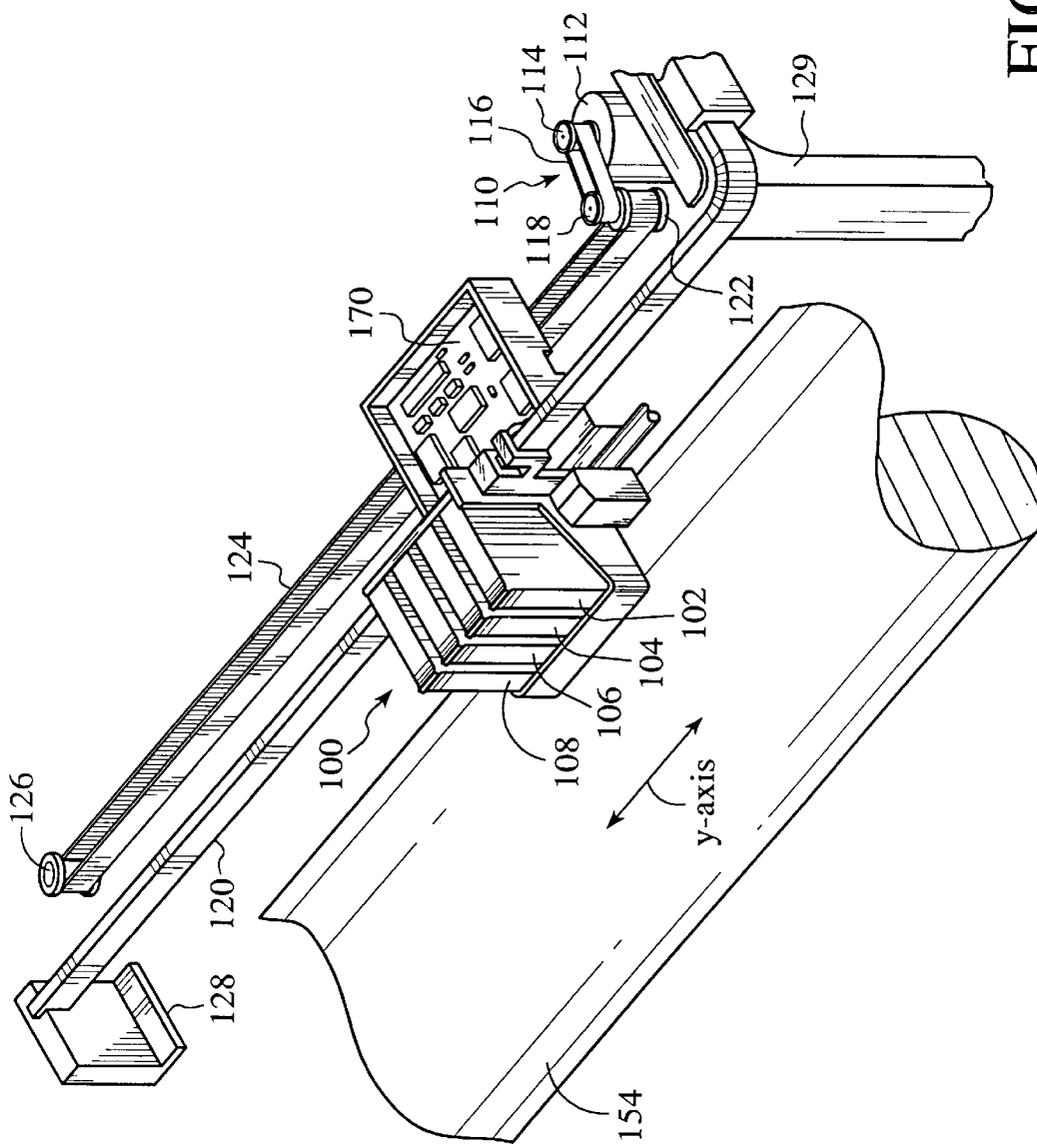
FIG. 3 is a perspective view of the carriage assembly, the carriage positioning mechanism, and the paper positioning mechanism of a printer/plotter similar to the one shown in FIG. 1.

FIG. 3 is a perspective view of a carriage assembly 100, a carriage positioning mechanism 110 and an encoder strip 120 for a printer similar to that shown in FIG. 1. The carriage positioning mechanism 110 includes a carriage position motor 112 which has a shaft 114 extending therefrom through which the motor drives a small belt 116. Through the small belt 116, the carriage position motor 112 drives an idler 122 via the shaft 118 thereof. In turn, the idler 122 drives a belt 124 which is secured by a second idler 126. The belt 124 is attached to the carriage 100 and adapted to slide therethrough.

The position of the carriage assembly in the y-direction along the scan axis is determined precisely by the use of the code strip 120. The code strip 120 is secured by a first stanchion 128 on one end and a second stanchion 129 on the other end. An optical reader (not shown) is disposed on the carriage assembly and provides carriage position signals which are utilized by the invention to achieve optimal image registration.

The media and carriage position information is provided to a processor on a circuit board 170 disposed on the carriage assembly 100 for use in connection with pen alignment techniques of the present invention. (The terms pen and cartridge are used interchangeably herein as is common in the art.)

The printer has four inkjet pens, 102, 104, 106, and 108 that store ink of different colors, e.g., black, yellow, magenta and cyan ink, respectively. As the carriage assembly 100 translates relative to the medium along the x and y axes, selected nozzles in the thermal inkjet cartridge pens are activated and ink is applied to the medium. The colors from the three color inkjet pens are mixed to obtain any other particular color.

Figure 4:
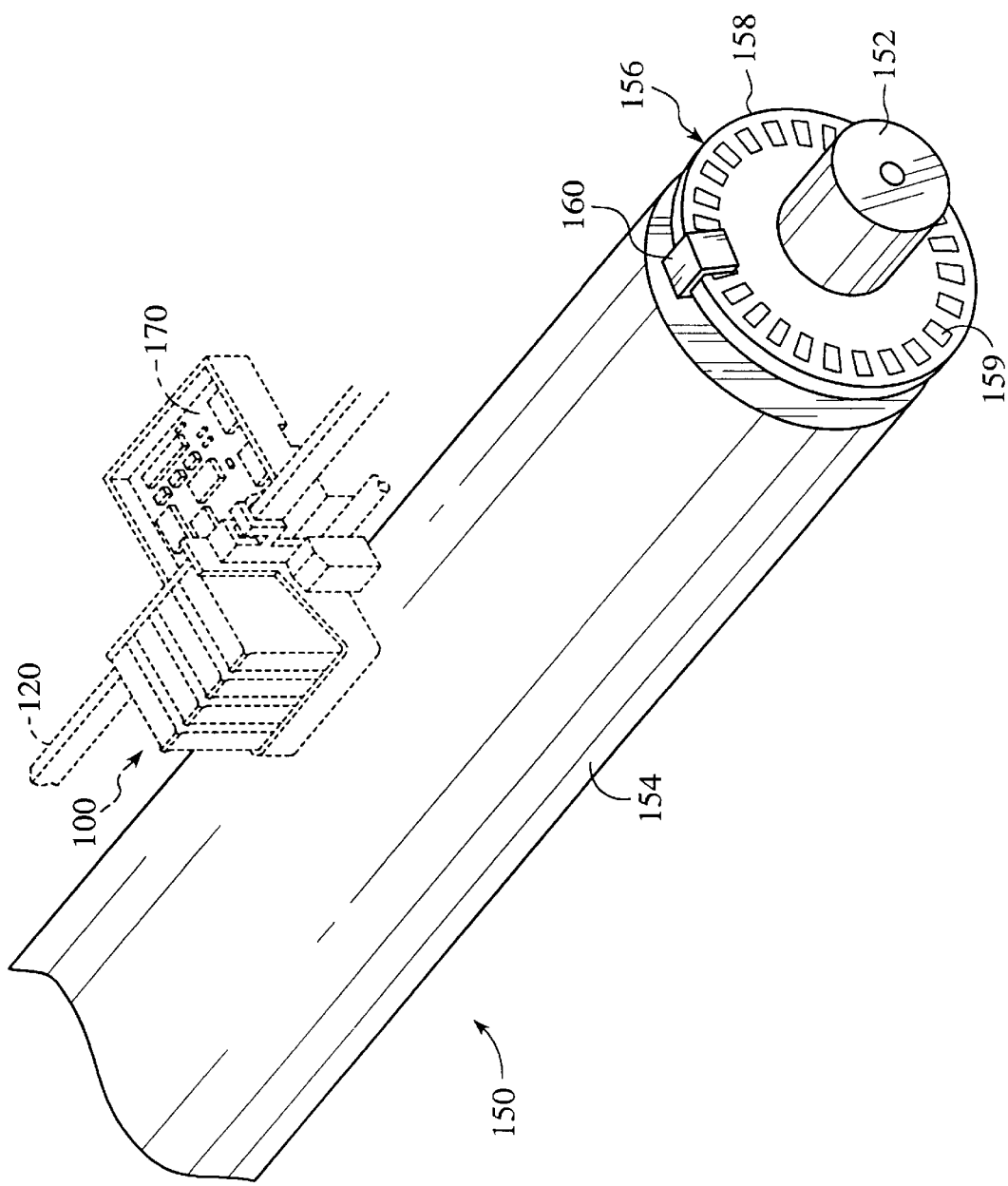
FIG. 4 is perspective view of a simplified representation of a media positioning system utilized in a printer/plotter similar to the one shown in FIG. 1.

FIG. 4 is perspective view of a simplified representation of a media positioning system 150 for advancing the media in the direction of the x-axis. The media positioning system 150 includes a motor 152 which is coaxial with a media roller 154. The position of the media roller 154 is determined by a media position encoder 156. The media position encoder includes a disc 158 having a plurality of apertures 159 therein. An optical reader 160 provides a plurality of output pulses which facilitate the determination of the roller 154 and, therefore, the position of the media 30 as well.

Figure 5:
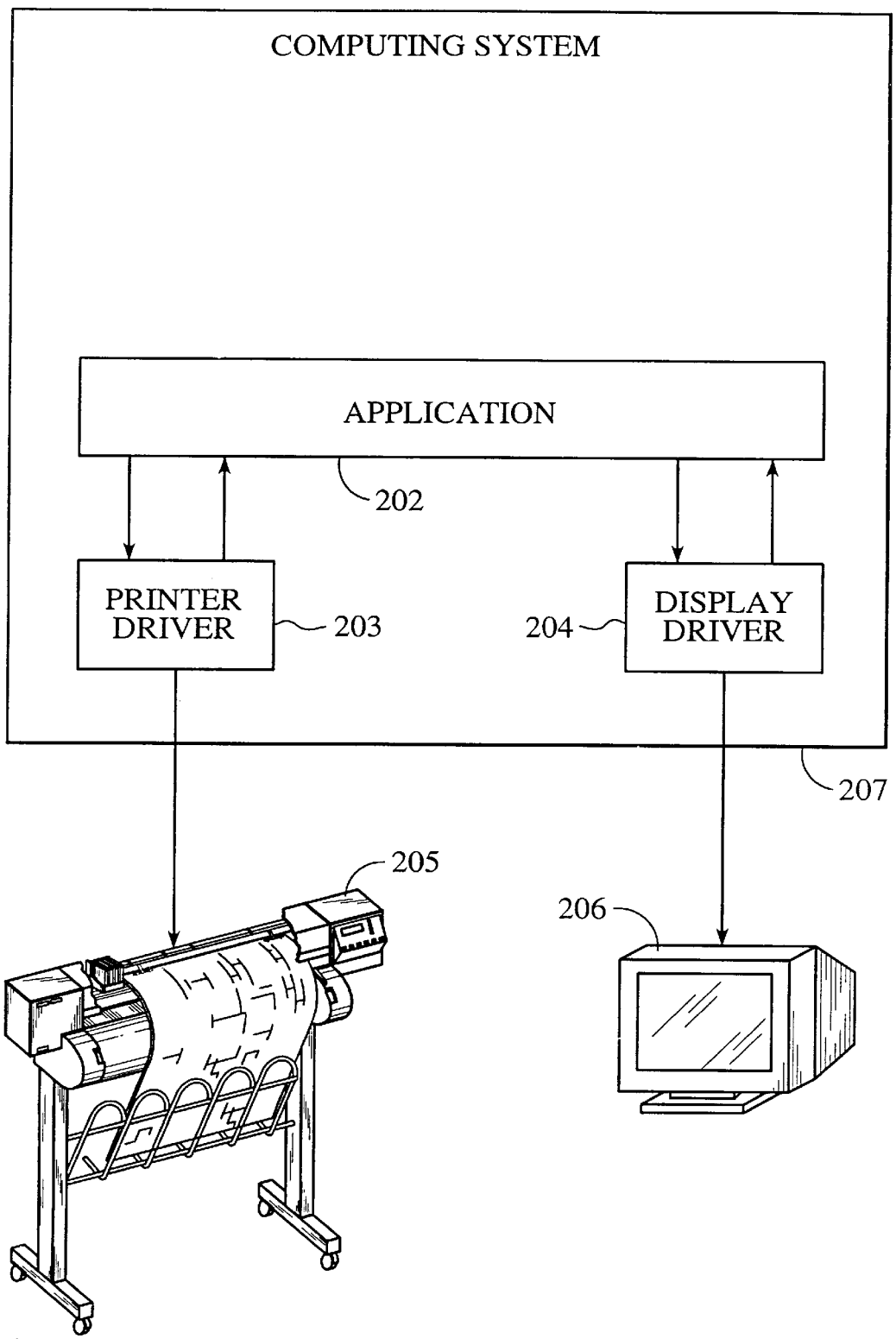
FIG. 5 shows a simplified block diagram of the organization of a computing system which includes drivers for a printer and a display in accordance with a preferred embodiment of the present invention.

FIG. 5 shows a simplified block diagram of the organization of a computing system 207. Computing system 207 runs various application processes, as illustrated in FIG. 5 by an application process 202. When application 202 desires to print information on a printer 205, or display information on a monitor 206, application process 202 makes calls to a printer driver 203. While in the preferred embodiment describe herein application process 202 makes calls directly to printer driver 203, the present invention may be variously implemented. For example, the present invention may be used with a graphic-device interface (GDI) which is a part of a Microsoft Windows operating system. See for example, Device Driver Adaptation Guide for the Microsoft Windows Operating System, Version 3.1, available from Microsoft Corporation.

For information to be displayed on monitor 206, application process 202 sends device-independent graphics commands to a display driver 204. Display driver 204 translates the independent graphics commands from application process 202 into commands which action display 206 can use to display the information. Driver 204 also can transfer to application process 202 information about color resolution, screen size and resolution, graphics capabilities and other advanced features that may be available on display 206.

For information to be printed on a printer 205, application process 202 sends device-independent graphics commands to a printer driver 203. Printer driver 203 translates the independent graphics commands from application process 202 into commands and action printer 205 can use to print the information. Printer driver 203 also can transfer to application 202 information about color resolution, resolution, graphics capabilities and other advanced features that may be available on printer 205.

In the preferred embodiment, application process 202, shown in FIG. 5, makes calls to printer driver 203 for printing. These calls are, for example, AUTOCAD driver interface (ADI) calls, raster ADI calls or vector ADI calls. Table 1 below shows typical calls made to printer driver 203.

TABLE 1

Raster Calls
ADI call received by printer driver 203

PLRASTER
Vector Calls
ADI call received by printer driver 203

MOVE
DRAW
PLFILL

TABLE 1-continued

NEW PEN
NEW LTYPE
NEW PEN WID
NEW SPEED
PEN RAISE

In the preferred embodiment of the present invention, printer driver 207 can be configured to utilize object banding. The configuration includes two potential inputs made by a user. The first input is a selection whether object banding or "optimized memory usage" will be utilized. The second input from the user is to designate the amount of memory installed on printer 205. In alternative embodiments of the present invention, printer driver 207 obtains directly from printer 205 information pertaining to the amount of memory installed on printer 205.

In the preferred embodiments of the present invention, adaptive banding is performed by pre-processing the graphics primitives within printer driver 203 within computing system 207. Rasterization, however, is done within printer 205.

Pre-processing includes partitioning and sorting the original drawing. Printer driver 203 performs the pre-processing. The original graphics primitives received by printer driver 203 from application process 202 are broken down into horizontals bands by printer driver 203. Printer driver 203 then sends the horizontal bands to printer 205 in sequential order. When sending each horizontal band, printer 205 sends the graphics primitives for all objects within the horizontal band.

Printer 205 prints the horizontal bands in a continuous and seamless manner. For example, printer 205 uses a Super-Flow mode, or other similar functionality, to achieve the continuous and seamless printing. See HP-GL/2 and HP RTL Reference Guide, Part number 5959–9733 1996, available from Hewlett Packard Co., having a business address of 3000 Hanover Street, Palo Alto, Calif. 94304. Table 2 below contrasts three printing modes: sleek, object and adaptive object banding. The sleek printing mode and the object printing mode are more fully described in the Background Section.

TABLE 2

| Printing Mode | Location of Functionality | Remarks |
|---|---|---|
| Sleek | Driver | Printer may be raster-only device. |
| Object | Printer | Printer driver may be general raster driver. |
| Adaptive Object Banding | Driver and Printer | Driver needs to know internal implementation of printer. Printer needs to support "SuperFlow mode" or similar functionality. Driver is required to take into account actions by printer firmware. |

Figure 6:
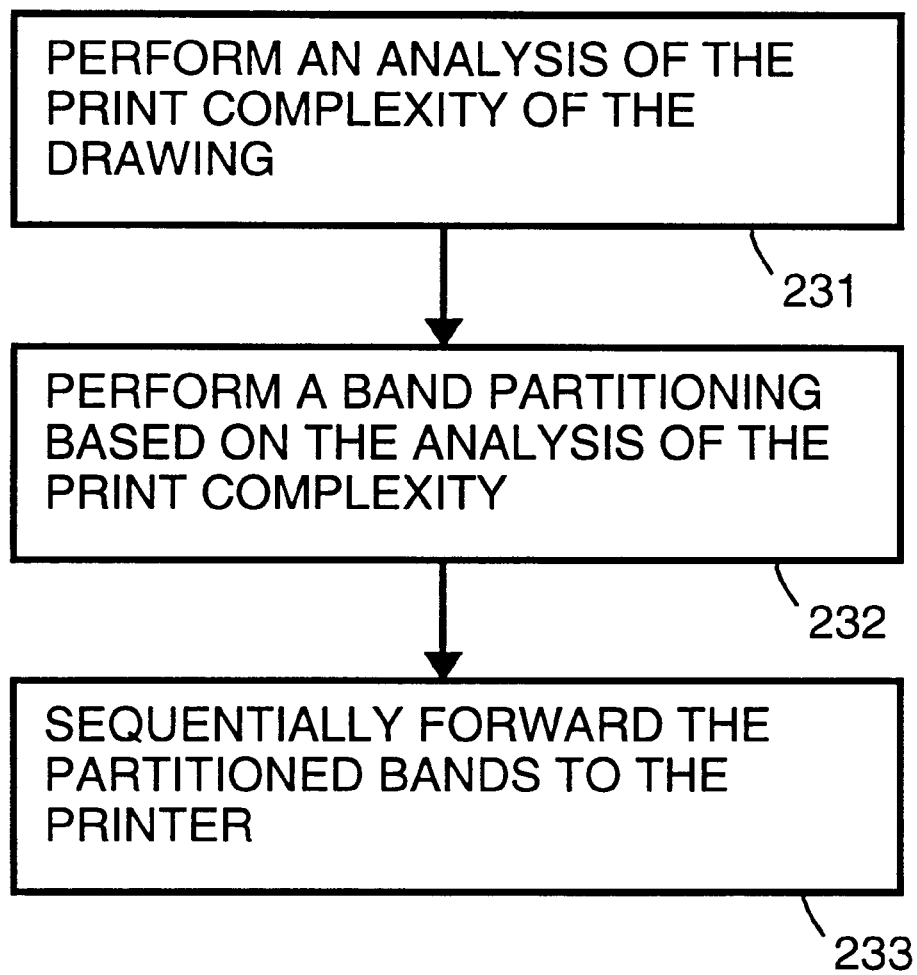
FIG. 6 is a flowchart which illustrates object banding as performed by a printer driver in accordance with a preferred embodiment of the present invention.

FIG. 6 is a flowchart which illustrates how printer driver 203 performs object banding. In a step 231, printer driver 203 performs an analysis of the print complexity of the drawing. This may be done in a number of ways. In the preferred embodiment this is done using a swath histogram of the drawing.

A swath is the minimum horizontal bitmap chunk printer 205 can dump on paper. The width of the swath is equivalent to the width of the loaded paper. For example, in one embodiment of the present invention the width of the loaded paper is 36 inches. At 300 dots per inch (dpi) the width of the swath is thus equivalent to 10800 pixels (36 in. * 300 dpi). At 600 dpi the width of the swath is thus equivalent to 21600 pixels (36 in. * 600 dpi). The height of the swath is generally dependent upon the particular pens (or ink nozzles) used in printer 205. For example, a typical swath height on a 300 dpi printer is 96 pixels and a typical swath height on a 600 dpi printer is 192 pixels.

The full drawing is analyzed before any information is sent to printer 205. During generation of the swath histogram, the graphics primitives received by printer driver 203 are processed internally by printer driver 203 and are stored in a custom display list file, on a storage device of computing system 207.

During generation of the swath histogram, each graphics primitive is processed emulating memory consumption which will be required by printer 205. Different graphics primitives will have different memory needs. Printer driver 203 utilizes a specific set of heuristics that will estimate the memory needs for each graphics primitive.

The swath histogram built by printer driver 203 represents the density of the drawing for each swath. This essentially tells printer driver 203 the amount of memory printer 205 will need to correctly process the graphics primitives for each swath. The swath histogram also indicates complexity of each swath. A more complex swath will have a higher value in the histogram. For example, printer driver 203 will determine that a swath with lots of vectors is more dense (complex) than a swath with only a few vectors.

In general, raster images are far more dense than sections of a drawing produced using vectors. This is caused by the way the firmware within printer 205 (and virtually all printers) handles different graphics primitives.

Figure 7:
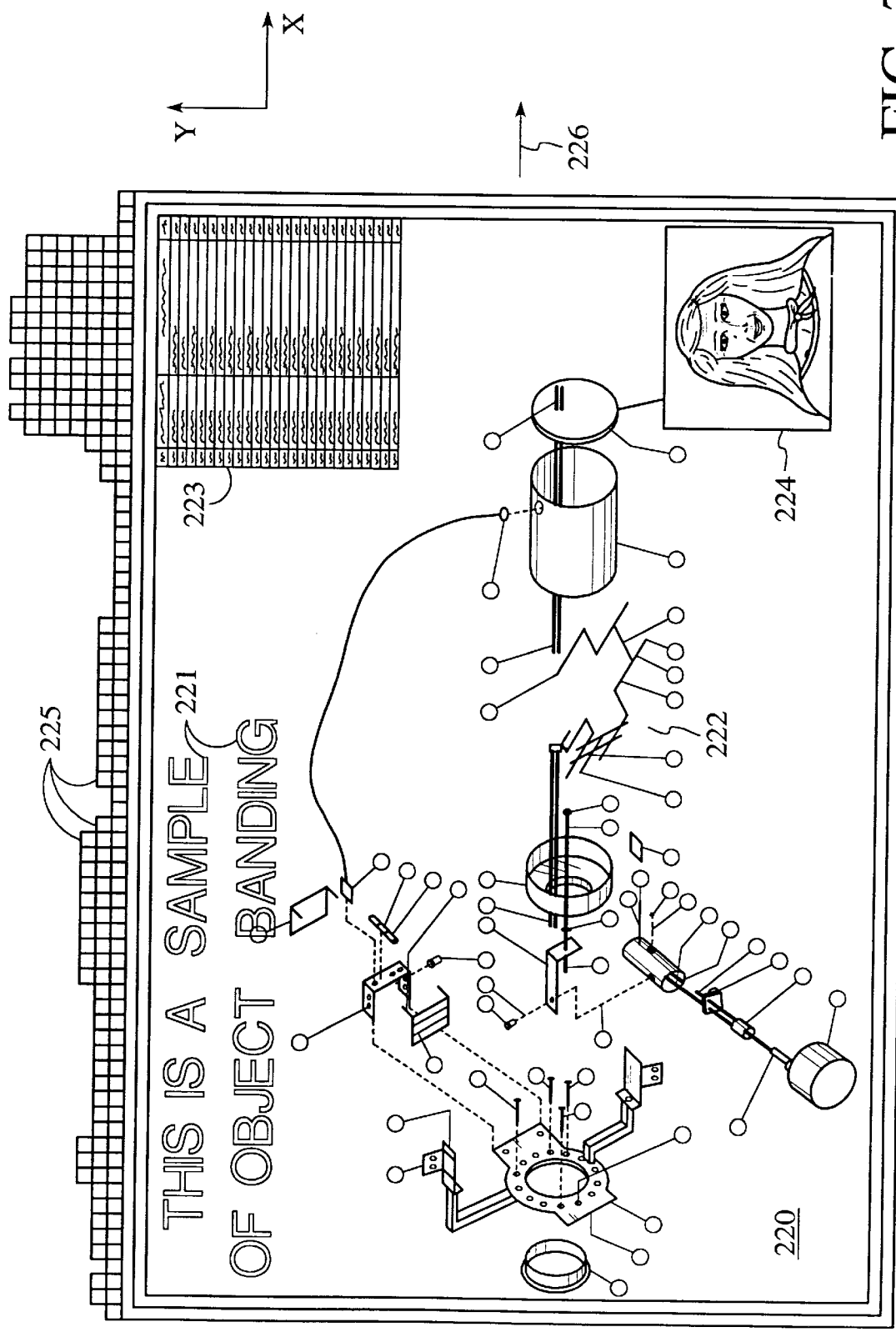
FIG. 7 shows a sample printer output and an associated histogram in accordance with a preferred embodiment of the present invention.

FIG. 7 shows a drawing 220. Drawing 220 includes text 221, a vector sketch 222, a schematic table 223 (which includes a text portion and a vector portion), and a raster image 224. A swath histogram 225 is composed of squares. Each row of squares in the y-direction indicates swath complexity for the swath. A larger number of squares in a row for a swath means the swath has higher complexity. A row with fewer squares indicates the swath has lower complexity.

An arrow 226 indicates media advance direction along the x-axis. Thus in the case of drawing 220, as portrayed in FIG. 7, the swaths and bands extend in the y-axis direction across the media, so that their orientation is horizontal with respect to printer 205.

Figure 8:
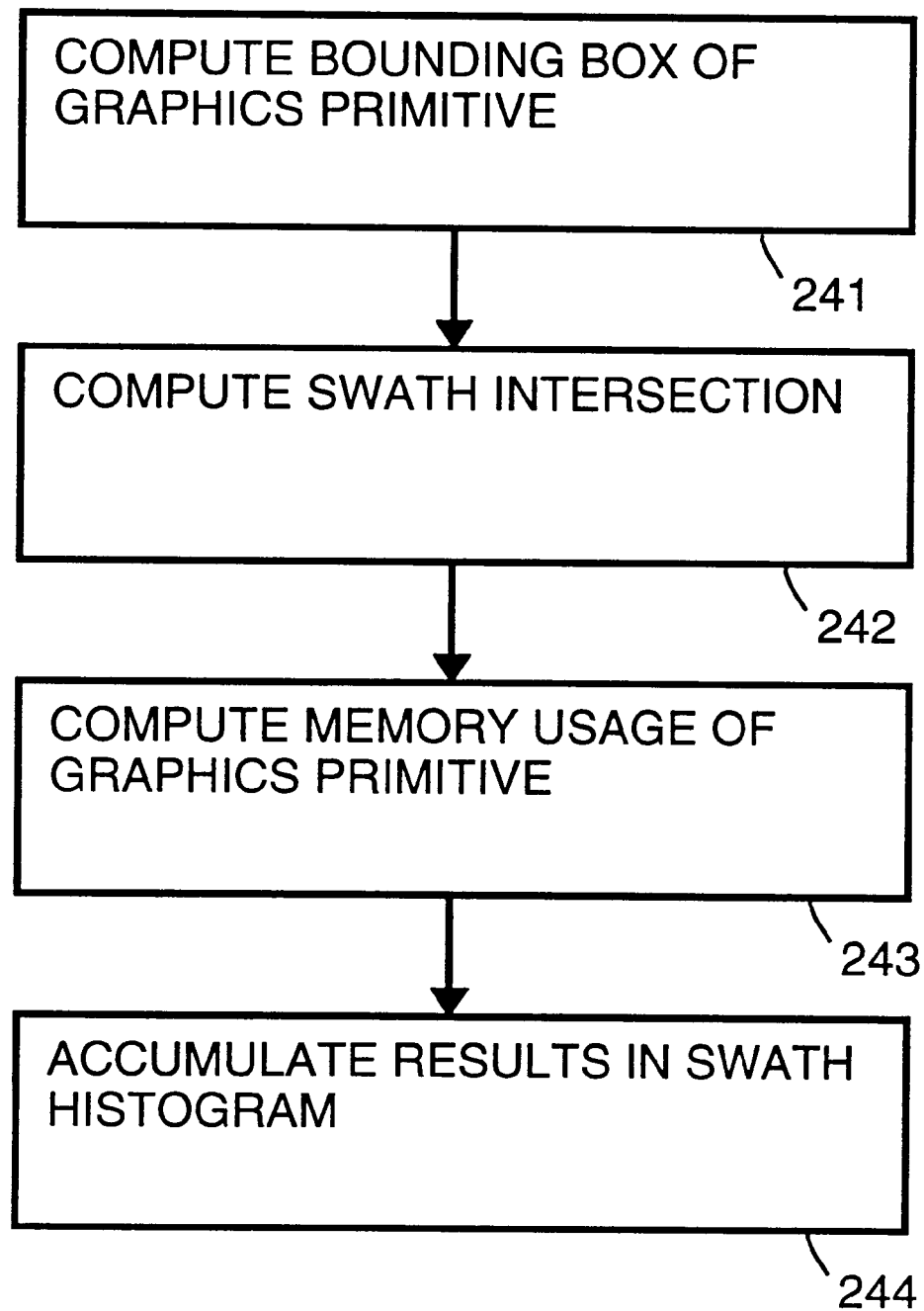
FIG. 8 is a flowchart which illustrates heuristics used by a printer driver to estimate memory consumption of a graphics primitive in accordance with a preferred embodiment of the present invention.

FIG. 8 is a flowchart which illustrates heuristics used by printer driver 203 to estimate memory consumption of a graphics primitive in accordance with a preferred embodiment of the present invention.

In the preferred embodiment, the heuristics used by printer driver 203 to compute printer memory consumption are an approximation of the real memory needs. In addition, the heuristics are conservative so that they will not underestimate memory usage and thus prevent an "Out of Memory". As a result, the heuristics may overestimate the memory needs for specific complex drawings. This however will only have a minor impact on performance.

As shown in FIG. 8, in a first step 241, printer driver 203 computes a bounding box of a graphics primitive. The bounding box sets boundaries within which the graphics primitive draws a graphics object. The bounding box for each graphics primitive is computed accordingly to the particular nature of the graphics primitive. For vector objects the width of the vector is taken into account when computing bounding box extents.

In a step 242, printer driver 203 computes a swath intersection. The swath intersection for a graphics primitive sets out which swaths contain at least a portion of the bounding box for the graphic object drawn by the graphic primitive. In the preferred embodiment, results from the swath intersection are stored in a display list file along with the graphic primitive data for use when performing band partitioning. Band partitioning is further described below. The storage of the swath intersection speeds up processing of the display list.

In a step 243, for each graphics primitive, printer driver computes estimated memory usage using the swath intersection information computed in step 242. This estimation is accumulated in a swath histogram for later use in the band partitioning. The memory needs for a graphic primitive will depend on the particular characteristics of the graphic primitive and whenever it will be clipped or not. For example, Table 3 below shows the memory needs in bytes for a current embodiment of the present invention.

TABLE 3

| Graphic Primitive | Memory needs (bytes) | Extra memory for clipping |
|---|---|---|
| Swath itself | 128 | N/A |
| Thin lines | 15 | 150 |
| Wide lines (>0.56 mm) | 150 | N/A |
| Styled lines (line w/type) | Memory(line) * lsegments | Memory(line) * lsegments |
| Polygons (edged, n vertexes | (20 + 25 * n) + Memory(line) * (n-1) | Memory(line) * (n-1) |
| Hatched polygons (hatch fill) | Memory(polygon) + Memory(line) * (n-1) * hlines | Memory(polygon) + Memory(line) * (n-1) * hlines |
| Raster Images (1bpp . . . 4bpp) | 82 + (columns * bpp)/8)*(swath rows + 1) | N/A |
| Raster images with patch | Memory(raster) + Memory(raster 1 bpp) | N/A |
| Annotations | 8K | N/A |
| Raster patterns (polygon fills | 8K color, 4K monochrome | N/A |
| Vector patterns (shaded lines | 6K color, 2K monochrome + 2K if vector transparency is enabled | N/A |

In Table 3 above, "Memory (X)" represents the memory consumption of printer 205 for a graphic primitive of type X. "l segments" is the estimated number of line segments a styled line will have. "hlines" is the number of lines needed to fill a polygon with a hatch (or cross hatch) mesh.

Correct detection of extra memory needed for clipped objects is performed with a custom algorithm based on object swath edge detection and accumulation. This is further discussed in the discussion of FIG. 9 below.

In a step 244, printer driver 203 accumulates the result in a swath histogram, as is further described below.

Figure 9:
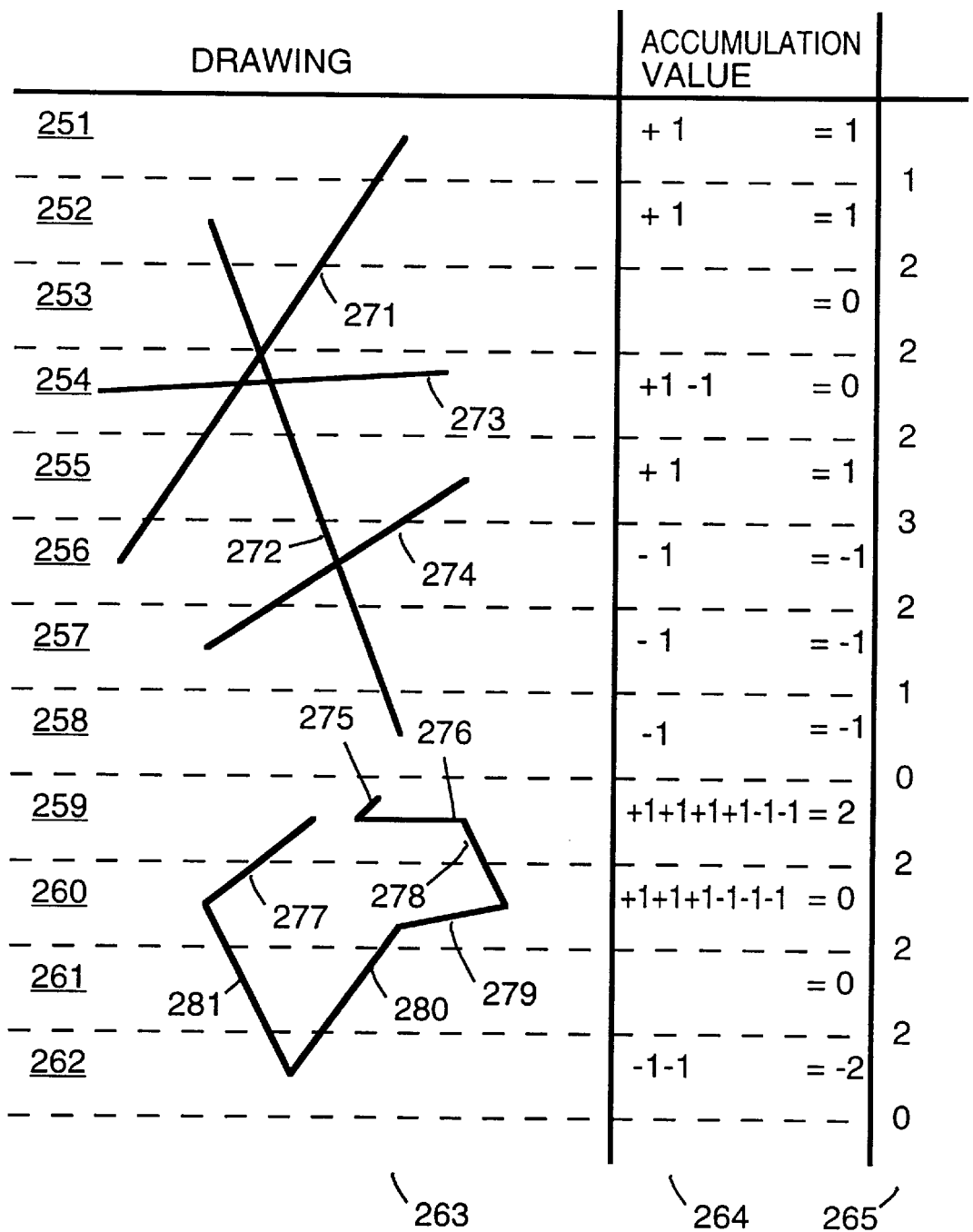
FIG. 9 illustrates operation of a custom algorithm which detects extra memory needed for clipped objects in accordance with a preferred embodiment of the present invention.

FIG. 9 shows a drawing 263 within a swath row 251, a swath row 252, a swath row 253, a swath row 254, a swath row 255, a swath row 256, a swath row 257, a swath row 258, a swath row 259, a swath row 260, swath row 261 and a swath row 262.

The basic idea of the algorithm is to add one (+1) to an accumulation value for a swath row in which an object starts and subtract one (−1) to an accumulation value for a swath row in which the object ends. The calculation of the accumulation value is shown in a column 264. When band partitioning of the drawing occurs, as described below, the accumulations values for the swaths are summed at the end of each swath. This is represented by a column 265. This sum value indicates how many objects cross from each swath to a following swath.

For example, as seen in FIG. 9, segment 271 begins in swath row 251 and ends in swath row 256. Thus the accumulation value for swath row 251 in column 264 includes a "+1" and the accumulation value for swath row 256 includes a "−1" for segment 271.

Segment 272 begins in swath row 252 and ends in swath row 258. Thus the accumulation value for swath row 252 in column 264 includes a "+1" and the accumulation value for swath row 258 includes a "−1" for segment 272.

Segment 273 begins in swath row 254 and ends in swath row 254. Thus the accumulation value for swath row 254 in column 264 includes a "+1" and the accumulation value for swath row 254 includes a "−1" for segment 273.

Segment 274 begins in swath row 255 and ends in swath row 257. Thus the accumulation value for swath row 255 in column 264 includes a "+1" and the accumulation value for swath row 257 includes a "−1" for segment 274.

Segment 275 begins in swath row 259 and ends in swath row 259. Thus the accumulation value for swath row 259 in column 264 includes a "+1" and the accumulation value for swath row 259 includes a "−1" for segment 275.

Segment 276 begins in swath row 259 and ends in swath row 259. Thus the accumulation value for swath row 259 in column 264 includes a "+1" and the accumulation value for swath row 259 includes a "−1" for segment 276.

Segment 277 begins in swath row 259 and ends in swath row 260. Thus the accumulation value for swath row 259 in column 264 includes a "+1" and the accumulation value for swath row 260 includes a "−1" for segment 277.

Segment 278 begins in swath row 259 and ends in swath row 2606. Thus the accumulation value for swath row 259 in column 264 includes a "+1" and the accumulation value for swath row 260 includes a "−1" for segment 278.

Segment 279 begins in swath row 260 and ends in swath row 260. Thus the accumulation value for swath row 260 in column 264 includes a "+1" and the accumulation value for swath row 260 includes a "−1" for segment 279.

Segment 280 begins in swath row 260 and ends in swath row 262. Thus the accumulation value for swath row 260 in column 264 includes a "+1" and the accumulation value for swath row 262 includes a "−1" for segment 280.

Segment 281 begins in swath row 260 and ends in swath row 262. Thus the accumulation value for swath row 260 in column 264 includes a "+1" and the accumulation value for swath row 262 includes a "−1" for segment 281.

In FIG. 9 all the objects are shown as vectors and thus the complexity of the objects is not a factor and the accumulation value in column 264 is either incremented or decremented. However, for more complex objects, the complexity of the object results in a larger number being added to or subtracted from the accumulation value in column 264. In this way the extra memory needed for clipping the objects can be estimated with reasonable accuracy.

Particularly, the accumulation value for each complex object is equal to the extra memory required when clipping the complex object. In order to take into account the extra memory needed for clipping, the accumulation value for each swath row may be added (or subtracted as the case may be) to each swath row when calculating the complexity of the swath row. This works, because if the accumulation values are reflected in the swath histogram, the sum value (represented in FIG. 9 as the sum value in column 265) will thus be reflected when performing band partitioning based on the swath histogram. That is, when a swath row is the last swath row in a particular band, the sum value calculated at the end of that swath row (accumulated to the swath histogram by way of the accumulation values of all the previous swath rows) represents the extra memory required for all the object that are clipped at the end of the swath row.

In a step 232, shown in FIG. 6, printer driver 203 performs a band partitioning of the drawing based on the analysis of the print complexity. In a step 233, printer driver 203 sequentially forwards the partitioned bands to printer 205. During this step, the graphics primitives stored in the display list file will be sent to printer 205. When sent to printer 205, the graphics primitives will be partitioned using the swath histogram computed earlier. The partitioning algorithm uses the information stored in the swath histogram to define the horizontal bands into which the drawing will be fragmented. Care is take so that each single band will correctly fit into the expected device memory.

The technique for partitioning follows an adaptive approach. Particularly, smaller bands are generated for very dense areas while larger bands are generated for low density or blank areas of the drawing.

The swath histogram is used to determine how many adjacent swaths can be joined into a band without overrunning the memory of printer 205. The amount of memory available for processing a band, in the preferred embodiment, is based on the total amount of memory installed in printer 205.

The resulting band is then used to determine the graphics primitives that need to be sent to printer 205. For a band, all the graphic primitives that fall directly or indirectly into swaths which form the band will be sent. The remaining graphics primitives of the drawings will not be sent for that band.

The results of the swath intersection test stored in the display list, as described above, make it very simple to determine which graphics primitives need to be sent. When raster images are clipped, only the part of the image that falls into the band is sent. The remainder of the raster image is not sent.

In the preferred embodiment, vector graphic primitives that fall into several bands are sent several times. For instance, if a line crosses two bands the graphics primitive which defines the line will need to be sent with both bands. While this introduces some redundancy for vector graphics primitives, the performance degradation is negligible for most drawings. If performance becomes a problem adding more memory to printer 205 will allow larger bands and fewer bands per drawing to be used.

Figure 10:
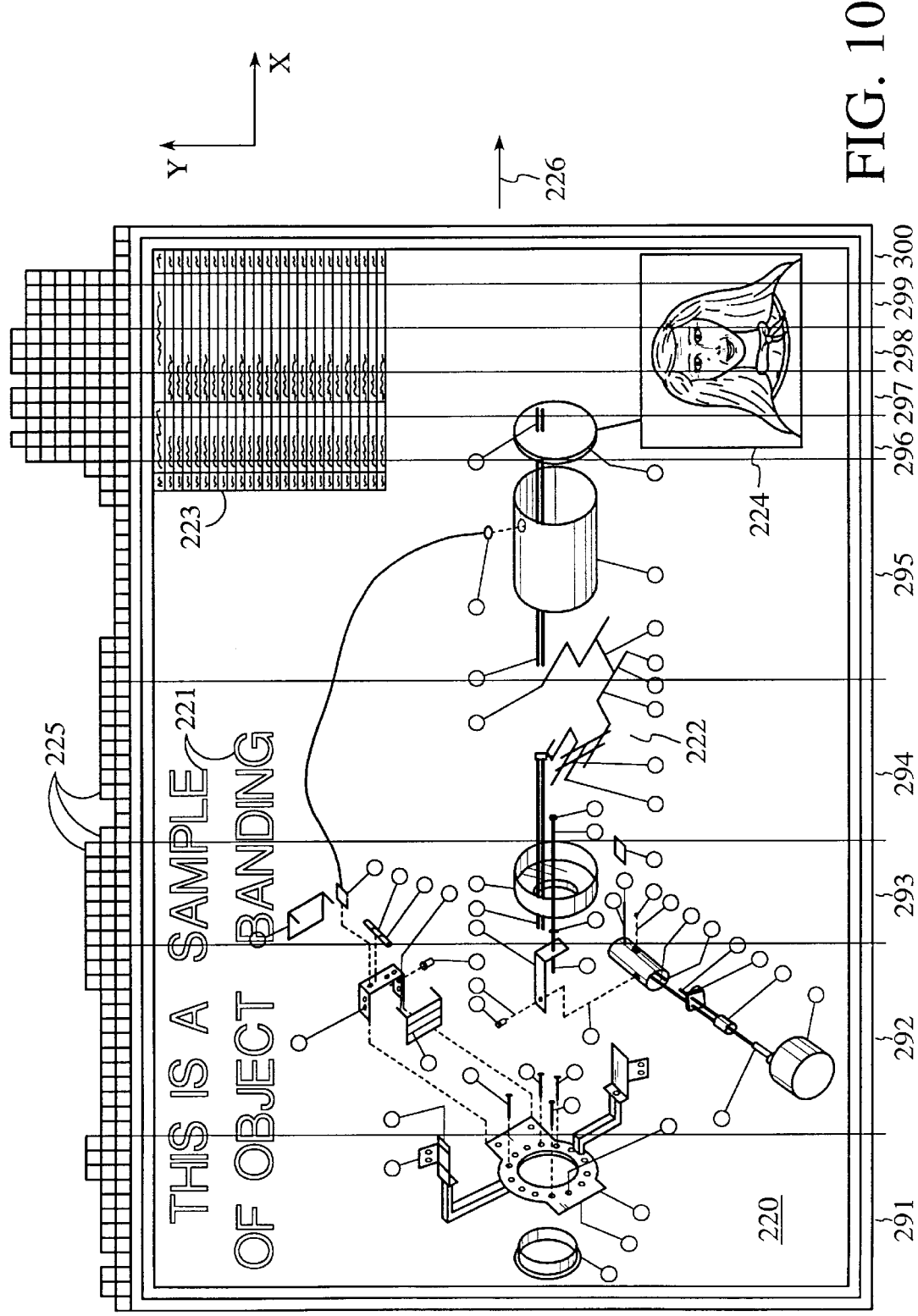
FIG. 10 shows a sample printer output broken into bands based on an associated histogram in accordance with a preferred embodiment of the present invention.

FIG. 10 illustrates the results of band partitioning. Based on availability of memory within printer 205, printer driver utilizes swath histogram 225 to calculate the band boundaries. For the example shown in FIG. 10, the memory within printer 205 is determined to be large enough to process within a single band the complexity represented by twenty-four squares of swath histogram 225. Thus, when partitioning drawing 220, the complexity index on banding draws a boundary before any swath which if added to the current band would cause the band to have a complexity greater than that represented by twenty-four squares of swath histogram 225. As can be seen, using this algorithm drawing 220 is partitioned into a band 291, a band 292, a band 293, a band 294, a band 295, a band 296, a band 297, a band 298, a band 299, a band 300 and a band 301.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. A method for preparing a drawing for printing, comprising the following steps:
    (a) performing an analysis of print complexity of the drawing;
    (b) partitioning the drawing into print bands based on the analysis of print complexity of the drawing performed in step (b), so that the print bands vary in size, a size of any particular print band depending upon information obtained when print complexity was analyzed; and,
    (c) forwarding the print bands in sequential order to a printing device.

2. A method as in claim 1 wherein step (a) includes the following substep:
    generating a swath histogram for the drawing.

3. A method as in claim 1 wherein step (a) includes the following substeps:
    (a.1) estimating drawing complexity within each swath of the drawing; and,
    (a.2) grouping adjacent swaths into bands so that processing each band will not cause a memory overflow in the printing device.

4. A method as in claim 3 wherein substep (a.1) includes for each swath estimating an amount of printer memory required to process each graphics primitive used to print an object which is within the swath.

5. A method as in claim 1 wherein step (a) includes the following substeps:
    (a.1) generating a boundary box for each graphics primitive within the drawing;
    (a.2) computing a swath intersection for each boundary box; and,
    (a.3) based on the swath intersection for each boundary box, determining print complexity within each swath.

6. A method as in claim 5 wherein substep (a.3) includes generating a swath histogram for the drawing based on the swath intersection for each boundary box.

7. A method as in claim 5 wherein substep (a.3) includes estimating an amount of printer memory required to process each graphics primitive used to print an object which is within the swath.

8. A method as in claim 1 wherein step (b) includes taking into account extra memory needed for clipping.

9. A method as in claim 1 wherein the printing device is a large media printer.

10. A method as in claim 1 wherein step (c) includes for each band forwarding graphics primitives which draw objects within the band.

11. Storage media which contains computer software, the computer software when executed on a computer performing a method for preparing a drawing for printing, the method comprising the following steps:
    (a) performing an analysis of print complexity of the drawing;
    (b) partitioning the drawing into print bands based on the analysis of print complexity of the drawing performed in step (b)), so that the print bands vary in size, a size of any particular print band depending upon information obtained when print complexity was analyzed; and,
    (c) forwarding the print bands in sequential order to a printing device.

12. Storage media as in claim 11 wherein step (a) includes the following substep:
    generating a swath histogram for the drawing.

13. Storage media as in claim 11 wherein step (a) includes the following substeps:
    (a.1) estimating drawing complexity within each swath of the drawing; and,
    (a.2) grouping adjacent swaths into bands so that processing each band will not cause a memory overflow in the printing device.

14. Storage media as in claim 13 wherein substep (a.1) includes for each swath estimating an amount of printer memory required to process each graphics primitive used to print an object which is within the swath.

15. Storage media as in claim 11 wherein step (a) includes the following substeps:
    (a.1) generating a boundary box for each graphics primitive within the drawing;
    (a.2) computing a swath intersection for each boundary box; and,
    (a.3) using the swath intersection for each boundary box to estimate print complexity within each swath.

16. Storage media as in claim 15 wherein substep (a.3) includes generating a swath histogram for the drawing based on the swath intersection for each boundary box.

17. A method used when determining print complexity of a drawing, the method comprising the following step:
    (a) performing the following substeps for a first swath:
        (a.1) ascertaining which graphics primitives print at least a portion of an object within the first swath,
        (a.2) computing memory usage for every graphics primitive which prints at least a portion of an object within the first swath, as ascertained in substep (a.1), and
        (a.3) summing the memory usage computed in substep (a.2) to produce a total memory usage for the swath.

18. A method as in claim 17 additionally comprising the following step:
    (b) repeating step (a) for every swath in the drawing.

19. A method as in claim 18 wherein step (a) additionally comprises the following substep:
    (a.4) adding to the total memory usage for the swath a clipping value which takes into account extra memory required for objects clipped at the end of the first swath.

20. A method as in claim 19 wherein substep (a.4) the clipping value is an accumulation value calculated using the following substeps:
    for a first graphics primitive which prints a first object which begins in the first swath, adding to the accumulation value a first primitive clipping value which represents extra memory required when clipping the first object; and
    for a second graphics primitive which prints a second object which ends in the first swath, subtracting from the accumulation value a second primitive clipping value which represents extra memory required when clipping the second object.

* * * * *